US011870294B2

(12) United States Patent
Butler et al.

(10) Patent No.: US 11,870,294 B2
(45) Date of Patent: *Jan. 9, 2024

(54) COMPACT MULTIFUNCTIONAL BATTERY BOOSTER

(71) Applicant: Schumacher Electric Corporation, Fort Worth, TX (US)

(72) Inventors: Brian F. Butler, Chicago, IL (US); Linh Nguyen, Elk Grove Village, IL (US); Patrick Clarke, St. Charles, IL (US); Shenzhong Zhu, Des Plaines, IL (US); Xiao Ping Chen, Buffalo Grove, IL (US)

(73) Assignee: Schumacher Electric Corporation, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,474

(22) Filed: Sep. 19, 2022

(65) Prior Publication Data

US 2023/0009406 A1 Jan. 12, 2023

Related U.S. Application Data

(63) Continuation of application No. 17/000,511, filed on Aug. 24, 2020, now Pat. No. 11,448,176, which is a
(Continued)

(51) Int. Cl.
*H02J 7/00* (2006.01)
*H02J 7/02* (2016.01)
(Continued)

(52) U.S. Cl.
CPC ............... *H02J 7/02* (2013.01); *B60L 53/20* (2019.02); *B60L 53/80* (2019.02); *B60L 58/25* (2019.02);
(Continued)

(58) Field of Classification Search
USPC .................................... 320/104, 105
See application file for complete search history.

(56) References Cited

U.S. PATENT DOCUMENTS 3,343,057 A   9/1967   Smith
3,590,357 A   6/1971   Reid
(Continued)

FOREIGN PATENT DOCUMENTS

EP      2712757 A2    4/2014
WO   2014142759 A1   9/2014

OTHER PUBLICATIONS

Cunningham, Wayne, Three pocket-size jump starters, http://www.cnet.com/news/pocket-sized-jump-starters/, Apr. 28, 2014.
(Continued)

*Primary Examiner* — Samuel Berhanu
(74) *Attorney, Agent, or Firm* — Michael Stanley Tomsa; McAndrews, Held & Malloy, Ltd.

(57) ABSTRACT

A portable power pack having a housing, a rechargeable lithium battery positioned in the housing, a liquid crystal display (LCD), a wireless charging coil, a light emitting diode (LED) flash light, a universal serial bus (USB) port, a direct current (DC) port, and a power management circuit. The LCD can be positioned on the housing and configured to display a status of the portable power pack. The wireless charging coil can be positioned in or on the housing and configured to wirelessly couple with an external wireless charging coil of an external device through electromagnetic induction in accordance with, for example, the Qi wireless power transfer standard. The USB port supplies a charging current to charge a portable electronic device, while the DC port supplies a starting current to jump start an engine of a vehicle that is electrically coupled with an external battery. The power management circuit operatively coupled to the
(Continued)

wireless charging coil and the rechargeable lithium battery and configured to output the charging current or the starting current.

28 Claims, 3 Drawing Sheets

Related U.S. Application Data continuation of application No. 15/495,344, filed on Apr. 24, 2017, now Pat. No. 10,801,460, which is a continuation of application No. 15/183,311, filed on Jun. 15, 2016, now Pat. No. 10,087,904, which is a continuation of application No. 14/826,805, filed on Aug. 14, 2015, now Pat. No. 9,397,513.

(60) Provisional application No. 62/037,379, filed on Aug. 14, 2014.

(51) Int. Cl.
   *H02M 3/155* (2006.01)
   *H02J 7/34* (2006.01)
   *B60L 53/80* (2019.01)
   *B60L 53/20* (2019.01)
   *B60L 58/25* (2019.01)
   *F02N 11/12* (2006.01)
   *H01M 10/0525* (2010.01)
   *H01M 10/42* (2006.01)

(52) U.S. Cl.
   CPC ......... *F02N 11/12* (2013.01); *H01M 10/0525* (2013.01); *H01M 10/425* (2013.01); *H02J 7/0042* (2013.01); *H02J 7/0045* (2013.01); *H02J 7/0047* (2013.01); *H02J 7/0068* (2013.01); *H02J 7/342* (2020.01); *H02J 7/345* (2013.01); *H02M 3/155* (2013.01); *H01M 2010/4271* (2013.01); *H02J 7/0048* (2020.01); *H02J 2207/20* (2020.01); *H02J 2207/40* (2020.01); *H02M 3/1557* (2021.05)

(56) References Cited

U.S. PATENT DOCUMENTS

| | | | |
|---|---|---|---|
| 3,950,688 A | 4/1976 | Sancey et al. | |
| 4,079,304 A | 3/1978 | Brandenburg | |
| 4,399,396 A * | 8/1983 | Hase | H02J 7/34 |
| | | | 340/636.15 |
| 4,829,223 A | 5/1989 | Broberg et al. | |
| 5,764,030 A | 6/1998 | Gaza | |
| 5,793,185 A | 8/1998 | Prelec et al. | |
| 5,796,255 A | 8/1998 | McGowan | |
| 5,814,972 A | 9/1998 | Shimada et al. | |
| 6,020,719 A | 2/2000 | Nishigaki et al. | |
| 6,130,519 A | 10/2000 | Whiting et al. | |
| 6,155,870 A | 12/2000 | Valentine | |
| 6,344,733 B1 | 2/2002 | Crass et al. | |
| 6,356,050 B1 | 3/2002 | Hussaini | |
| 6,377,029 B1 | 4/2002 | Krieger et al. | |
| 6,380,712 B2 | 4/2002 | Murphy et al. | |
| 6,424,158 B2 | 7/2002 | Klang | |
| 6,466,025 B1 | 10/2002 | Klang | |
| 6,679,212 B2 | 1/2004 | Kelling | |
| 6,756,764 B2 | 6/2004 | Smith | |
| 6,788,025 B2 | 9/2004 | Bertness et al. | |
| 6,799,993 B2 | 10/2004 | Krieger et al. | |
| 6,819,010 B2 | 11/2004 | Burke | |
| 6,871,151 B2 | 3/2005 | Bertness | |
| 6,871,625 B1 | 3/2005 | Burke | |
| 6,943,666 B2 | 9/2005 | Mooney et al. | |
| 6,988,475 B2 | 1/2006 | Burke | |
| 7,003,411 B2 | 2/2006 | Bertness | |
| 7,015,674 B2 | 3/2006 | VonderHaar | |
| 7,161,253 B2 | 1/2007 | Sodeman | |
| 7,161,476 B2 | 1/2007 | Hardman et al. | |
| 7,301,303 B1 | 11/2007 | Hulden | |
| 7,345,450 B2 | 3/2008 | Krieger | |
| 7,408,358 B2 | 8/2008 | Knopf | |
| 7,498,767 B2 | 3/2009 | Brown et al. | |
| 7,501,795 B2 | 3/2009 | Bertness et al. | |
| 7,528,579 B2 | 5/2009 | Pacholok et al. | |
| 7,598,743 B2 | 10/2009 | Bertness | |
| 7,656,118 B2 | 2/2010 | Krieger et al. | |
| 7,772,850 B2 | 8/2010 | Bertness | |
| 7,774,151 B2 | 8/2010 | Bertness | |
| 7,808,211 B2 | 10/2010 | Pacholok et al. | |
| 7,808,375 B2 | 10/2010 | Bertness et al. | |
| 7,834,593 B2 | 11/2010 | Johnson et al. | |
| 7,915,856 B2 | 3/2011 | Krampitz et al. | |
| 7,924,015 B2 | 4/2011 | Bertness | |
| 8,013,567 B2 | 9/2011 | Windsor | |
| 8,120,364 B2 | 2/2012 | Elder et al. | |
| 8,179,103 B2 | 5/2012 | Doljack | |
| 8,237,412 B2 | 8/2012 | Johnson et al. | |
| 8,386,199 B2 | 2/2013 | Goff et al. | |
| 8,437,908 B2 | 5/2013 | Goff et al. | |
| 8,513,949 B2 | 8/2013 | Bertness | |
| 8,558,690 B2 | 10/2013 | Kleve et al. | |
| 8,575,899 B2 | 11/2013 | Whiting et al. | |
| 8,576,061 B2 | 11/2013 | Miller et al. | |
| 8,610,396 B2 | 12/2013 | Hunter et al. | |
| 8,664,912 B2 | 3/2014 | Olsberg | |
| 8,664,915 B2 | 3/2014 | Sutardja | |
| 8,674,654 B2 | 3/2014 | Bertness | |
| 8,854,013 B2 | 10/2014 | Gao et al. | |
| 8,872,516 B2 | 10/2014 | Bertness | |
| 8,947,054 B2 | 2/2015 | Johnson et al. | |
| 8,958,998 B2 | 2/2015 | Bertness | |
| 9,007,015 B1 | 4/2015 | Nook et al. | |
| 9,013,323 B2 | 4/2015 | Grothaus et al. | |
| 9,018,958 B2 | 4/2015 | Bertness | |
| 9,060,213 B2 | 6/2015 | Jones | |
| 9,216,659 B2 | 12/2015 | Seo et al. | |
| 9,260,067 B2 | 2/2016 | Kai | |
| 9,263,907 B2 | 2/2016 | Richardson et al. | |
| 9,371,067 B2 | 6/2016 | Dao et al. | |
| 9,506,446 B2 | 11/2016 | Xinfang | |
| 9,525,297 B2 | 12/2016 | Wang | |
| 9,553,460 B2 | 1/2017 | Dao et al. | |
| 9,581,654 B2 | 2/2017 | Campbell et al. | |
| 2001/0038276 A1 | 11/2001 | Resch et al. | |
| 2002/0008523 A1 | 1/2002 | Klang | |
| 2002/0041174 A1 | 4/2002 | Prelec et al. | |
| 2002/0145404 A1 | 10/2002 | Dasgupta et al. | |
| 2002/0167294 A1 | 11/2002 | Nagata et al. | |
| 2003/0052645 A1 | 3/2003 | Sasaki | |
| 2003/0137277 A1 | 7/2003 | Ichiro | |
| 2004/0130298 A1 | 7/2004 | Krieger et al. | |
| 2004/0239290 A1 | 12/2004 | Krieger | |
| 2005/0258797 A1 | 11/2005 | Hung | |
| 2005/0285445 A1 | 12/2005 | Wruck et al. | |
| 2006/0133007 A1 | 6/2006 | Shiue et al. | |
| 2006/0244412 A1 | 11/2006 | Bonzer et al. | |
| 2007/0063675 A1 | 3/2007 | Walline et al. | |
| 2007/0278990 A1 | 12/2007 | Raichle et al. | |
| 2007/0285049 A1 | 12/2007 | Krieger | |
| 2008/0061733 A1 | 3/2008 | Toya | |
| 2008/0246443 A1 | 10/2008 | Doljack | |
| 2008/0275737 A1 * | 11/2008 | Gentry | G06Q 10/10 |
| | | | 705/3 |
| 2009/0171600 A1 | 7/2009 | Machiyama | |
| 2009/0174362 A1 | 7/2009 | Richardson | |
| 2009/0218988 A1 | 9/2009 | Richardson et al. | |
| 2009/0246596 A1 | 10/2009 | Sridhar | |
| 2010/0039065 A1 | 2/2010 | Kinkade, Jr. | |
| 2010/0072946 A1 | 3/2010 | Sugano | |
| 2010/0117591 A1 | 5/2010 | Thomas et al. | |
| 2010/0225270 A1 | 9/2010 | Jacobs et al. | |
| 2010/0241377 A1 | 9/2010 | Kagawa | |
| 2010/0301800 A1 * | 12/2010 | Inskeep | H02J 7/342 |
| | | | 320/105 |

(56) References Cited

U.S. PATENT DOCUMENTS

| | | |
|---|---|---|
| 2010/0315046 A1 | 12/2010 | Trainor et al. |
| 2011/0029157 A1 | 2/2011 | Muzaffer |
| 2011/0046831 A1 | 2/2011 | Ananthakrishna |
| 2011/0074350 A1 | 3/2011 | Kocher |
| 2011/0100735 A1 | 5/2011 | Flett |
| 2011/0130905 A1 | 6/2011 | Mayer |
| 2011/0258112 A1 | 10/2011 | Eder et al. |
| 2012/0068662 A1 | 3/2012 | Durando |
| 2012/0105010 A1 | 5/2012 | Kinoshita |
| 2012/0140752 A1 | 6/2012 | Yun |
| 2012/0235473 A1 | 9/2012 | Jiang et al. |
| 2012/0309315 A1 | 12/2012 | Sakata |
| 2013/0002049 A1 | 1/2013 | Stampfli |
| 2013/0020993 A1 | 1/2013 | Taddeo |
| 2013/0086409 A1 | 4/2013 | Lu et al. |
| 2013/0099738 A1 | 4/2013 | Brockman et al. |
| 2013/0241498 A1 | 9/2013 | Koebler |
| 2013/0264875 A1 | 10/2013 | Kaminsky et al. |
| 2013/0310112 A1 | 11/2013 | You et al. |
| 2013/0314025 A1* | 11/2013 | Keuss ............... H02J 7/00 320/162 |
| 2014/0013128 A1 | 1/2014 | Wong |
| 2014/0084844 A1 | 3/2014 | Weflen |
| 2014/0088827 A1 | 3/2014 | Yashiro |
| 2014/0107864 A1 | 4/2014 | Cecchini |
| 2014/0132206 A1* | 5/2014 | Zhu ............... H02J 50/10 320/108 |
| 2014/0139175 A1 | 5/2014 | Gonzalez |
| 2014/0159509 A1* | 6/2014 | Inskeep ............ H02J 7/342 307/150 |
| 2014/0253017 A1 | 9/2014 | Kominami et al. |
| 2014/0300310 A1 | 10/2014 | Caren |
| 2014/0300311 A1 | 10/2014 | Caren et al. |
| 2015/0102781 A1 | 4/2015 | Inskeep |
| 2015/0130400 A1 | 5/2015 | Inskeep |
| 2015/0168499 A1 | 6/2015 | Palmisano |
| 2015/0372531 A1 | 12/2015 | Tanabe |
| 2016/0072323 A1 | 3/2016 | Miller et al. |
| 2016/0072329 A1 | 3/2016 | Miller et al. |
| 2016/0181587 A1 | 6/2016 | Koebler et al. |
| 2016/0226266 A1 | 8/2016 | Huang |
| 2016/0238667 A1 | 8/2016 | Palmisano et al. |
| 2016/0268645 A1 | 9/2016 | Koebler |

OTHER PUBLICATIONS

Schumacher Electric: "XC103W 100 Amp Battery Charger with Engine Start from Schumacher," Aug. 11, 2014 (Aug. 11, 2014), pp. 1-2, XP054979296, Retrieved from the Internet: URL:https://www.youtube.com/watch?v=dZ6YduxgsMA&feature=youtu.be&t=51 [retrieved on Apr. 11, 2019].

"Jump-N-Carry® Models 300, 400, 660, 950, 4000 & 12/24" Specification Sheet.

International Search Report and Written Opinion, dated Nov. 23, 2015, in International application No. PCT/US2015/045335, filed Aug. 14, 2015.

International Preliminary Report on Patentability, dated Feb. 14, 2017, in International application No. PCT/US2015/045335, filed Aug. 14, 2015.

Supplemental European Search Report for Application No. EP 15 83 2596, dated Feb. 1, 2018.

Supplemental European Search Report for Application No. EP 15 83 1498, dated Mar. 15, 2018.

Communication in European Application No. EP 15 832 596.9, dated Feb. 5, 2019.

Communication in European Application No. EP 15 831 498.9, dated Apr. 18, 2019.

Examination report No. 1 for standard patent application in Australian Application No. 2018241089, dated Nov. 25, 2019.

Examination report No. 1 for standard patent application in Australian Application No. 2020201589, dated Nov. 5, 2020 (4 pages).

Office Action for Canadian Application No. 2,958,154, dated Aug. 11, 2021 (6 pages).

* cited by examiner

COMPACT MULTIFUNCTIONAL BATTERY BOOSTER

CROSS REFERENCE TO RELATED APPLICATIONS

This application is a continuation of and claims priority to U.S. application Ser. No. 17/000,511, filed on Aug. 24, 2020, which is a continuation of and claims priority to U.S. application Ser. No. 15/495,344, filed on Apr. 24, 2017, U.S. Pat. No. 10,801,460, issued on Oct. 13, 2020, which is a continuation of U.S. application Ser. No. 15/183,311, filed on Jun. 6, 2015, U.S. Pat. No. 10,087,904, issued Oct. 2, 2018 which is a continuation of U.S. application Ser. No. 14/826,805, filed on Aug. 14, 2015, U.S. Pat. No. 9,397,513, issued Jul. 19, 2016, which claims priority to U.S. Provisional Patent Application No. 62/037,379, filed on Aug. 14, 2014. Each application is hereby incorporated by reference in its entirety.

TECHNICAL FIELD

The present disclosure relates to an improved portable power pack, and, more particularly, to an improved lithium ion battery booster and charger. In certain aspects, the portable power pack provide wireless charging functionality, for example, through electromagnetic induction and/or magnetic resonance.

BACKGROUND

It is well known that motorists from time to time find themselves with a battery of insufficient charge to start their vehicle. This is generally an occasion of extreme inconvenience and distress, particularly where one finds himself in this situation in an area where there are other vehicles and drivers, but no means for connecting the battery of the disabled vehicle to the battery of one of the other available vehicles. To remedy this, battery boosters were developed to jump start stranded cars. For example, U.S. Pat. No. 4,079,304 discloses a battery booster system for jump starting an engine of a vehicle with a defective (or depleted) battery and interconnecting the same with a vehicle having a charged battery. Similarly, U.S. Patent Publication No. 2014/0159509 discloses a portable battery boost and jump starter apparatus for charging a vehicle battery. Typically, such battery booster systems rely on an internal lead acid battery, which is typically large, heavy, and cumbersome. Despite the advancements thus far, a need exists for an improved compact multifunctional battery booster, and, more particularly, to an improved lithium ion battery booster.

SUMMARY

The present disclosure is directed to an improved portable power pack, and, more particularly, to an improved lithium ion battery booster and charger. In certain aspects, the portable power pack provide wireless charging functionality, for example, through electromagnetic induction and/or magnetic resonance.

According to a first aspect, a portable power pack comprises: a housing; a rechargeable lithium battery positioned in the housing; a liquid crystal display (LCD) positioned on the housing and configured to display a status of the portable power pack; a wireless charging coil positioned in or on the housing and configured to wirelessly couple with an external wireless charging coil of an external device through electromagnetic induction in accordance with the Qi wireless power transfer standard; a light emitting diode (LED) flash light powered by said rechargeable lithium battery; a universal serial bus (USB) port to supply a charging current to charge a portable electronic device; a DC port to supply a starting current to jump start an engine of a vehicle that is electrically coupled with an external battery; and a power management circuit operatively coupled to the wireless charging coil and the rechargeable lithium battery, wherein the power management circuit is configured to output the charging current from the rechargeable lithium battery to the portable electronic device via the USB port or the starting current from the rechargeable lithium battery to the vehicle via the DC port.

According to a second aspect, a portable power pack comprises: a housing; a rechargeable lithium battery positioned in the housing; a display device positioned on the housing and configured to display a status of the portable power pack; a wireless charging coil positioned in or on the housing and configured to wirelessly couple with an external wireless charging coil of an external device through electromagnetic induction; a universal serial bus (USB) port to supply a charging current to charge a portable electronic device; a DC port to supply a starting current to jump start an engine of a vehicle that is electrically coupled with an external battery; and a power management circuit operatively coupled to the wireless charging coil and the rechargeable lithium battery, wherein the power management circuit is configured to output the charging current from the rechargeable lithium battery to the portable electronic device via the USB port or the starting current from the rechargeable lithium battery to the vehicle via the DC port.

In certain aspects, the wireless charging coil is configured to wirelessly couple with the external wireless charging coil in accordance with the Qi wireless power transfer standard.

In certain aspects, the external device is a charging pad.

In certain aspects, the DC port employs an EC5 connector.

In certain aspects, the portable power pack further comprises a set of battery cables to electrically couple the vehicle to the EC5 connector. The set of battery cables comprises a set of battery clamps.

In certain aspects, the display device is a liquid crystal display (LCD) and the status is a state of charge of the rechargeable lithium battery represented as a numerical value.

In certain aspects, the portable power pack further comprises a light emitting diode (LED) flash light powered by said rechargeable lithium battery.

In certain aspects, the portable power pack further comprises a reverse polarity sensor configured to detect a polarity of the external battery.

According to a third aspect, a portable power pack comprises: a housing; a rechargeable lithium battery positioned in the housing; a display device positioned on the housing and configured to display a status of the portable power pack; a wireless charging coil positioned in or on the housing and configured to transfer power wirelessly with an external device; one or more direct current (DC) output ports; and a power management circuit operatively coupled to the wireless charging coil and the rechargeable lithium battery, wherein the power management circuit is configured to output DC power from the rechargeable lithium battery via the one or more DC output ports.

In certain aspects, the wireless charging coil is configured to wirelessly couple with an external wireless charging coil of the external device through magnetic resonance.

In certain aspects, the wireless charging coil is configured to wirelessly couple with an external wireless charging coil of the external device through electromagnetic induction.

In certain aspects, the wireless charging coil is configured to wirelessly couple with the external wireless charging coil in accordance with the Qi wireless power transfer standard.

In certain aspects, the external device is a charging pad.

In certain aspects, the one or more DC output ports include a first DC port to supply a first DC power and a second DC port to supply a second DC power that is greater than the first DC power.

In certain aspects, the one or more DC output ports further comprises a third DC port to supply a third DC power, wherein the first DC power and third DC power are each rated (1) 5.0 volts and (2) 3.0 amperes or less.

In certain aspects, the first DC port is a universal serial bus (USB) port.

In certain aspects, the second DC port employs an EC5 connector.

In certain aspects, the portable power pack further comprises a set of battery cables having battery clamps to couple with a vehicle, wherein the set of battery cables is configured to removably couple with the EC5 connector.

In certain aspects, the status is a state of charge of the rechargeable lithium battery represented as a numerical value.

In certain aspects, the portable power pack further comprises a wireless transceiver to wirelessly communicate data between the portable power pack and a portable electronic device, wherein the portable power pack is configured to communicate the status of the portable power pack to the portable electronic device via the wireless transceiver.

In certain aspects, the portable power pack further comprises a light emitting diode (LED) flash light powered by said rechargeable lithium battery.

DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

DETAILED DESCRIPTION

Figure 1:
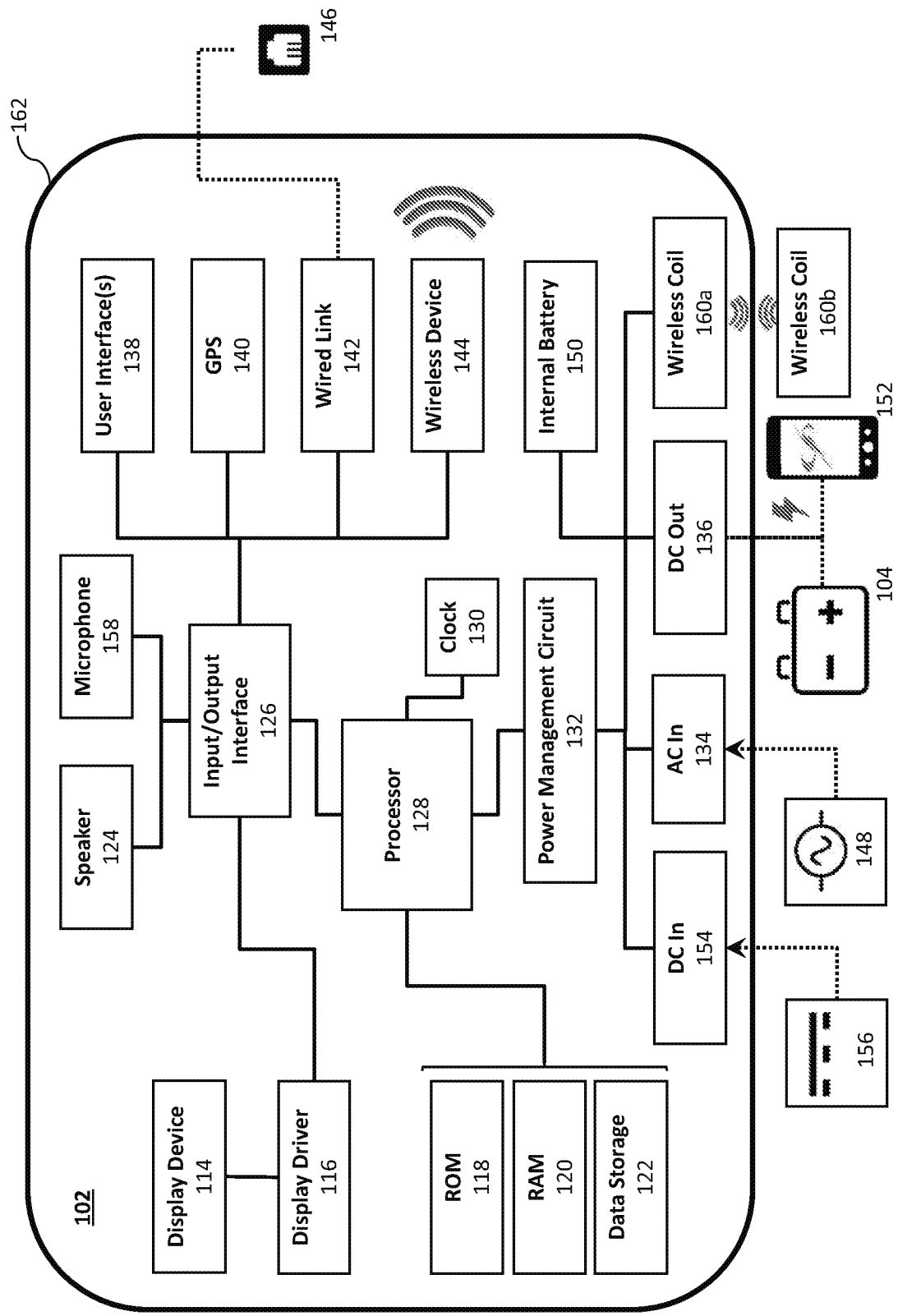
FIG. 1 illustrates an exemplary compact battery charger block diagram configured for use with a battery charging system.

Preferred embodiments of the present invention will be described hereinbelow with reference to the accompanying drawings. In the following description, well-known functions or constructions are not described in detail because they may obscure the invention in unnecessary detail. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, circuitry or a device is "operable" of "configured" to perform a function whenever the circuitry or device comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or any other form.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

A compact battery charger 102, as disclosed herein, may be used to start (a/k/a "boost", "jump", or "jump start") an engine coupled to an external battery 104 (e.g., a 6V/12V nominal voltage vehicular battery, which may be fully or partially depleted). In certain aspects, the compact battery charger 102 may be further configured to charge the external battery 104, and/or other electronic devices operatively coupled with the compact battery charger 102. Example vehicular batteries include, without limitation, lead-acid batteries (e.g., wet/flooded batteries, calcium-calcium batteries, Valve-Regulated, Lead Acid (VRLA) batteries, gel cell, and Absorbed Glass Mat (AGM)) and other rechargeable batteries (e.g., lithium ion, lithium ion polymer, Nickel-Metal Hydride (NiMH), Nickel Cadmium (NiCd)). Other electronic devices that may be operatively coupled with the compact battery charger 102 include, for example, portable electronic devices 152 (e.g., phones, tablet computers, portable computers, etc.), toys, etc.

FIG. 1 illustrates a block diagram of an example compact battery charger 102. Specifically, FIG. 1 illustrates a compact battery charger 102 having a processor 128 (e.g., a central processing unit (CPU)) that is operatively coupled to a Read-Only Memory (ROM) 118 for receiving one or more instruction sets, to a Random Access Memory (RAM) 120 having a plurality of buffers for temporarily storing and retrieving information, and to an internal data storage device 122 (e.g., a hard drive, such a solid state drive, or other non-volatile data storage device, such as flash memory). A clock 130 is also coupled to the processor 128 for providing clock or timing signals or pulses thereto. Those skilled in the art will understand that the compact battery charger 102 includes one or more bus structures for interconnecting its various components. Further, to increase ease of use in mobile applications, the various components of a compact battery charger 102 may be housed in a single housing 162. In certain aspects, multiple processors 128 may be provided to facilitate operation of the compact battery charger 102, whether or not embodied within the compact battery charger 102 itself. Accordingly, serial communication may be employed to communicate information and data between multiple processors that may be used.

The internal battery 150 may be a rechargeable lithium battery for outputting a direct current (DC) voltage, such as lithium iron phosphate and lithium ion polymer batteries. The internal battery 150 should be sufficiently rated to boost (jump start) a vehicle coupled to an external battery 104. For example, the internal battery 150 may be rated from about 3,000 mah to 20,000 mah, or higher. A compact battery charger 102 having a 12,000 mah internal battery 150, for instance, may output 200 cranking amps/400 peak amps during the jump start function, which is sufficient to start a vehicle, but higher power internal batteries are contemplated for larger vehicles and trucks. In certain embodiments, the internal battery 150 may comprise a plurality of electrically coupled batteries (e.g., connected in parallel, or when multiple lower voltage batteries are to be summed, in series). For example, lithium ion batteries containing LiFePO, $LiFePO_4$, $LiFeMgPO_4$, and $LiFeYPO_4$ have a nominal cell voltage of about 3.2V to 3.3V each. Thus, internal battery 150 need not be limited to a single battery or single battery cell. Accordingly, four lithium ion cells may be connected in series to achieve a nominal voltage of 12.8V to 13.2V. To the extent that a higher nominal voltage is desired, additional lithium ion cells may be connected in series to achieve higher voltages.

The compact battery charger 102 may receive external power via a direct current (DC) input terminal 154 coupled to a DC power supply 156 and/or an alternating current (AC) input terminal 134 coupled to an AC power supply 148. AC power supply 148 may be wall current (e.g., 110 VAC), while the DC power supply 156 may be, for example, an automotive cigarette lighter (e.g., 12 VDC) or a USB port (i.e., 5 VDC). The compact battery charger 102 may provide a plurality of DC outputs 136 to facilitate charging energy (e.g., to external battery 104 or one or more portable electronic devices 152) or boosting energy (e.g., to a vehicle/external battery 104). In certain aspects, such as when a USB Port or 12V port is used, a DC connector may be used for both DC input terminal 154 and DC output terminal 136. That is, the compact battery charger 102 may draw power from a device coupled to the DC connector (functioning as a DC input terminal 154), or supply power to the device coupled to the DC connector (functioning as a DC output terminal 136). To convert the AC power supply 148, an AC to DC transformer may be provided, which may be integral with, or external to, the compact battery charger 102. An AC to DC transformer may removably coupled to wall current and removably coupled to the compact battery charger 102.

In certain aspects, a power inverter and AC output terminal may be provided to output an AC voltage (e.g., a 110 VAC output). In such an embodiment, power from the DC power supply 156 or the internal battery 150 may be processed (e.g., using a DC to AC inverter) and used to supply the AC voltage to the AC output terminal.

In operation, when the AC power supply 148 or DC power supply 156 is unavailable (e.g., disconnected, out of service, when a circuit breaker is blown, the compact battery charger 102 is otherwise disconnected, etc.), the compact battery charger 102 may draw the power needed to operate the compact battery charger's 102 components from the external battery 104 and/or internal battery 150, thereby enabling the user to determine the status of the compact battery charger 102 (and state of charge, or other parameters, of the external battery 104) when the AC power supply 148 and the DC power supply 156. To that end, the compact battery charger 102 may report a power supply failure (e.g., as an alert) to one or more portable electronic devices 152 (e.g., phones, tablet computers, portable computers, or other handheld terminals) within a battery monitoring system via a communication network. A suitable example battery monitoring system is disclosed by commonly owned U.S. patent Ser. No. 14/826,747 by Brian F. Butler et al, filed Aug. 14, 2015 and titled "Battery Charger Status Control System And Method."

The battery charging method or technique can be any of a variety of charging techniques including conventional, fast charging, and the like. The compact battery charger 102 may be further configured to determine, automatically, different battery chemistry (e.g., AGM, gel, lithium ion, etc.) and the battery's nominal voltage. The charging characteristics of a battery charger may be configured to match the battery chemistry of the battery to be charged. For example, lead acid batteries may be charged with constant power, constant current, constant voltage, or combination thereof. Such batteries are known to be charged with both linear as well as switched-mode battery chargers. U.S. Pat. No. 7,808,211, assigned to the same assignee as the assignee of the present invention, discloses an example of a switched-mode battery charger for automotive and marine battery applications. Further, commonly owned U.S. Pat. No. 8,947,054 discloses a battery charger and method utilizing alternating DC charging current, while commonly owned U.S. Pat. No. 8,575,899 discloses a battery charger with automatic voltage detection.

The identified battery chemistry and voltage may be displayed on display device 114. The compact battery charger 102 may indicate to the user (e.g., via display device 114) the number of ampere hours put into battery, and/or an indication of the state of health of the external battery 104. For example, if customer inputs a battery size/model number, the compact battery charger 102 can use the battery capacity to provide the state of health. The compact battery charger 102 may indicate to the user the state of charge or health of the internal battery 150 (e.g., the number of coulombs) via display device 114.

The compact battery charger 102 may further include an input/output interface 126 that interfaces the processor 128 with one or more peripheral and/or communicative devices, such as a user interface 138, a Global Positioning System (GPS) transmitter 140, a wired link 142, a wireless device 144, a microphone 158, and a speaker 124, which may be used to signal an alert (e.g., charge complete, error, etc.) or other status information.

As illustrated, the processor 128 may be operatively coupled to a display device 114 via a display driver 116. The display device 114 may comprise, or otherwise employ, one or more light emitting diodes (LEDs) and/or a liquid crystal display (LCD) screen. The LCD screen may be an alphanumeric segmented LCD display, or a matrix LCD display, such as those used on portable electronic devices. In certain embodiments, the LCD screen may further provide touch screen functionality to facilitate user input device via a thin layer of sensing circuitry present either beneath the visible portion of display device 114's surface, or as part of a thin, clear membrane overlying the display device 114 that is sensitive to the position of a pen or finger on its surface. In operation, the display driver 116 may receive display data from the processor 128 via input/output interface 126 and display that display data via the display device 114. For example, interactive display device 114 may be provided on the housing 162 to provide the user with status information and/or input capability (e.g., via a touch screen or voice commands using, for example, wave files). Reminders, or other information (e.g., status information), may be displayed to the user, via the display device 114, as a scrolling message or menu structure (e.g., a graphical user interface (GUI)).

With regard to the internal data storage device 122, example flash memory devices include, for example, memory cards, such as RS-MMC, miniSD, microSD, etc. The internal data storage device 122 can function as an external hard drive or flash drive, thereby enabling the user to store digital files to the compact battery charger 102. In instances where the internal data storage device 122 is removable, as is the case with memory cards, the user can interchange, upgrade, or remove the memory card (e.g., if the compact battery charger 102 becomes defective) to avoid data loss. The display device 114 may be used to display, for example, the contents of the internal data storage device 122, the remaining storage capacity (e.g., as a percentage or in terms of available bytes), and, in certain aspects, the digital files themselves (e.g., photos may be displayed, files accessed, etc.). In certain aspects, in addition to (or in lieu of) charging a portable electronic device (e.g., a smart phone), the compact battery charger 102 may back up digital content stored to the portable electronic device 152 when the portable electronic device 152 is coupled to the compact battery charger 102 via, for example, the USB port.

When an external battery 104 is connected to DC output terminal 136 (e.g., via clamps), the display device 114 may display the external battery 104's voltage. The display device 114 may also indicate the state of charge in terms of percent of charge of the jump starter's internal battery 150. During user inactivity, such as when charging the external battery 104 or the internal battery 150, the display device 114 may enter a sleep mode and will not display any messages until activity is detected (e.g., when devices are connected/disconnected from the compact battery charger 102 or the user interface 138 is actuated). As discussed below, if the external battery 104's voltage is too low to detect, the display device 114 may remain blank and the voltage will not display, but a manual start procedure may be selected to enable the jump start function. The jump start function may be used to start a vehicle having an external battery 104 (e.g., a depleted automotive battery). The jump start function causes the compact battery charger 102 to output about 400-600 peak amperes (270-405 cranking amperes) via clamps coupled to the DC output terminal 136. One of skill in the art, however, would recognize that the internal battery 150 may be replaced with a higher capacity battery to facilitate higher output currents.

In one example, once an AC power supply 148 is connected, a first LED may be illuminated to indicate that the compact battery charger's 102 internal battery 150 is charging. When the compact battery charger 102 is fully charged, Example messages include those illustrated in Table A, where "[XX]" represents a measured or calculated value.

TABLE A

| Message | Status/Condition |
|---|---|
| Charging [XX] % | Coupled to AC power supply 148 or DC power supply 156 and internal battery 150 is charging. |
| Fully Charged | Coupled to AC power supply 148 and internal battery 150 is fully charged. |
| Battery Too Hot To Charge | Disconnect from AC power supply 148 or DC power supply 156 and allow internal battery 150 to cool down before charging. |
| Battery Too Cold To Charge | The temperature of the internal battery 150 is too low. |
| Charging-USB On | The USB port is in use while the internal battery 150 is charging. |
| Charging-12 V On | The 12 V port is in use while the internal battery 150 is charging. |
| Fully Charged-USB On | The internal battery 150 is fully charged and the USB port is in use. |
| Fully Charged-12 V On | The internal battery 150 is fully charged and the 12 V port is in use. |
| Unplug Charger | Attempting to use the jump starter function while the internal battery 150 is charging. |
| Charge Aborted | Charging cannot be completed normally. |
| Battery [XX] %-USB On | The USB port is in use. The percentage shows the internal battery 150's charge. |
| Battery [XX] %-12 V On | The 12 V port is in use. |
| 12 V/USB Overload | The 12 V/USB port is overloaded. |
| Battery Low-Recharge | While using the 12 V/USB port, the internal battery 150's voltage has dropped. The 12 V/USB power will shut off after 10 minutes. |
| Battery [XX] %-Clamps Disconnected | The compact battery charger 102 is turned on, but does not detect external battery 104. |
| Warning-Reverse Polarity | The DC output terminal 136 is connected backwards to an external battery 104 (i.e., reverse polarity). |
| Battery Low-Recharge | The jump start function button has been selected, but the internal battery 150 has discharged below a predetermined level. |
| Turn Off 12 V/USB | The jump start function button has been selected, but 12 V/USB function is activated. |
| Off | The jump start button has been pressed twice. |
| Battery Too Hot | The internal temperature of the internal battery 150 is too warm. Allow internal battery 150 to cool down before attempting another jump start. |
| Jump Start Ready-Battery Cold: Reduced Performance | The temperature of the internal battery 150 is too low, which reduces cranking performance. |
| Jump Start Ready | The jump start button has been pressed, compact battery charger 102 is correctly connected to a vehicle battery, and the compact battery charger 102 is ready for jump start function. |
| Battery Cool Down-[XX] Seconds Remaining | Shows waiting time needed before attempting another engine start. | a second LED on the unit may be illuminated. Finally, when the DC output terminal 136 is successfully coupled (e.g., clamped or otherwise electrically coupled) to external battery 104, a third LED may be illuminated. Rather than employing separate LEDs, an LCD display or a single multi-color LED may be employed that changes color depending on the status of the compact battery charger 102. The compact battery charger 102 may be further equipped with a light, which functions as a map light, flash light, emergency light, etc. The light may be activated and deactivated via user interface 138. The light may be an LED that outputs, for example, about 1 Watt/90 Lm.

When an LCD display is employed, the display device 114 may be configured to display, in addition to, or in lieu of, the LEDs, a number of messages to indicate the current status, or operation of the compact battery charger 102 to the user. In selecting the message(s) to display, the compact battery charger 102 measures one or more parameters of the internal battery 150, external battery 104, or of the compact battery charger 102. Parameters include, for example, voltage, power capacity, temperature, connection status, etc.

The user interface 138 may be used to enable the user to switch the output charge amperage (e.g., 1 A, 10 A, 50 A, 100 A, etc.) or another setting (e.g., charge, boost, other). Example user interface 138 devices may include, for example, physical buttons, physical switches, a digitizer (whether a touch pad, or transparent layer overlaying the display device 114), voice command (e.g. via the microphone 158 and speaker 124), and other input devices. For instance, using the digitizer, a user may control or interact with the compact battery charger 102 by writing or tapping on the display device 114 using, a pen, stylus, or finger.

The GPS transmitter 140 may be used to track and/or monitor the location of the compact battery charger 102 and to relay the location information in the form of positional data (e.g., geographic coordinate system data or Internet Protocol (IP) address) to a booster management server or another device in battery charging system or via a communication network. For example, a computer may be configured to track the activities, location, and/or charge history of a particular compact battery charger 102 in a battery charging system. The positional data may also be locally stored to the compact battery charger 102 (e.g., to internal data storage device 122).

The wireless device 144 may be configured to manage communication and/or transmission of signals or data between the processor 128 and another device (e.g., a remote interface device via a communication network or directly with a remote interface device) by way of a wireless transceiver. The wireless device 144 may be a wireless transceiver configured to communicate via one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. For example, wireless connectivity (e.g., RF 900 MHz or Wi-Fi) may be integrated with the compact battery charger 102 to provide remote monitoring and control of the compact battery charger 102 via one or more portable electronic devices 152. Using a wireless device 144, a user may be able to start and/or stop the compact battery charger's 102 charge cycle or otherwise change the settings.

That is, via a communication network and a booster management server, a user may monitor live charging status updates, charging conditions, historic data, remotely update software and firmware, and stay connected with the compact battery charger 102 manufacturer's news and updates. In certain aspects, an internal cellular modem may be implemented that utilizes standards-based wireless technologies, such as 2G, 3G, 4G, Code Division Multiple Access (CDMA), and Global System for Mobile Communications (GSM), to provide wireless data communication over worldwide cellular networks. An advantage of an internal cellular modem is that there is no reliance on a user's local network (e.g., wireless router, modem, etc.), thereby enabling communication between the compact battery charger 102 and communication network, even in the event of a total power failure in a user's location.

In certain aspects, a wired link 142 may be provided to manage communication and/or transmission of signals or data between the processor 128 and another device via, for example, a data port 146 (e.g., RS-232, USB, and/or Ethernet ports) capable of being wiredly coupled with another data port 146 positioned outside the compact battery charger 102 housing 162. As noted above, a USB port or 12V supply may be provided as DC output terminals 136 on the charger to facilitate the charging of accessories, such as portable electronic devices 152. Thus, the compact battery charger's 102 internal battery 150 may also be used as a power source for one or more DC accessories. Charging while operating the accessories can extend run time of the compact battery charger 102, but will also extend recharge time. If the load exceeds the charging input amperage (e.g., 1 A), however, the accessory being charged may discharge the internal battery 150.

The USB port may provide, for example, up to 3.0 A at 5 VDC. To activate the USB port, a USB power button (or other user selectable element) may be provided via user interface 138. The USB port may be activated by pressing the USB power button, and disabled by, for example, pressing the USB power button a second time, two or more times in quick succession, or held for a predetermined period of time. The 12 VDC power output may provide, for example, up to 6.0 A a 12 VDC.

The compact battery charger 102 may further comprise a plurality of sensors to provide measurement data descriptive of the surrounding environment. In certain aspects, the USB output may automatically shut off when no load is detected (e.g., after 5-10 minutes of a no load state). The 12 VDC power supply, however, may remain active until the compact battery charger 102 reaches a low battery state (e.g., the internal battery 150's charge level is less than a predetermined threshold, e.g., number of coulombs). The 12 VDC power supply may be used to supply power to an integrated or remotely situated air compressor (e.g., for tire inflation) and may further function as a memory saver. The 12 VDC power supply may be limited to 6.0 A with over current protection. In certain aspects, a user may wish to check the internal battery 150's charge level. To do so, a button (or other user selectable element) may be provided via user interface 138 that causes the charge level to be displayed on the display device 114. To ensure accuracy of the measurement, the user may be instructed (e.g., via display device 114) to turn off the compact battery charger 102 before actuating the button (or displaying the charge level). In one aspect, the display device 114 can show the internal battery 150's percent of charge, or a battery icon indicating the same. For example, the display device 114 may display "100%" (or a solid battery icon) when the internal battery 150 is fully charged.

The compact battery charger 102 may include a temperature or humidity sensor, or configured to monitor other appliances or devices, either directly (e.g., using a sensor) or wirelessly (e.g., using Wi-Fi). For example, the compact battery charger 102 may be configured to charge and monitor, in addition to automotive batteries, one or more portable electronic devices 152 being charged by said compact battery charger 102. Another temperature sensor may be provided to measure the temperature of a battery being charged (e.g., a lithium-ion battery). If the measured temperature deviates from an operating range (i.e., a range in which the measured value is acceptable), the charging or boosting operating may be prohibited.

A power management circuit 132 may be used to manage power needed to operate the compact battery charger 102 (and components thereof), start an engine, and to charge the external battery 104 or other device. That is, AC power may be drawn from an AC power supply 148, converted to DC power, and used to charge external battery 104 and/or internal battery 150. For instance, the compact battery charger 102 may be removably coupled with an AC power supply 148 located outside the housing 162 (e.g., a wall outlet) via an AC input terminal 134 and an AC to DC converter. In such an example, an AC wall charger may receive 120 VAC from an electrical wall outlet and output, via an inverter, 12 VDC to the compact battery charger's 102 input socket. When charging, an LED (e.g., a green LED) may light, and/or the display device 114 may display a message such as "Charging—[XX]%." When the charging has completed, the LED may pulse, and/or the display device 114 may display a message such as "Fully Charged."

In certain aspects, a Single-Ended Primary-Inductor Converter (SEPIC) circuit 302, in conjunction with an AC to DC converter 314, may be used to charge the internal battery 150. Generally speaking, a SEPIC circuit 302 is a type of DC to DC converter that allows the electrical potential (voltage) at its output to be greater than, less than, or equal to that at its input. The output of a SEPIC circuit 302 is controlled by the duty cycle of the control transistor. A SEPIC circuit 302 exchanges energy between capacitors and inductors in order to convert a variable input voltage to a predetermined output voltage. The amount of energy exchanged is controlled by a switch, which may be a transistor such as a Metal-Oxide- Semiconductor Field-Effect Transistor (MOSFET). As a result, a SEPIC circuit 302 enables a wide variation in input voltage both substantially higher and lower than nominal battery voltage. For example, to charge a 12 volt battery (nominal voltage) to 14.4V, the variable input voltage can be a voltage from a predetermined range, such as between 5 VDC to 20 VDC, thereby enabling internal battery 150 recharging functionality via a USB port, which is 5 VDC. That is, the input voltage may not be always known, but the predetermined range may be known. In certain aspects, the SEPIC circuit 302 may be shut off (e.g., bypassed) to facilitate a higher efficiency charge. For example, if a 20V power supply is used, the compact battery charger 102 may bypass the SEPIC circuit 302, whereas, if 12 VDC power supply (e.g., a vehicle charger accessory) is used, the SEPIC circuit 302 may be employed.

Figure 3:
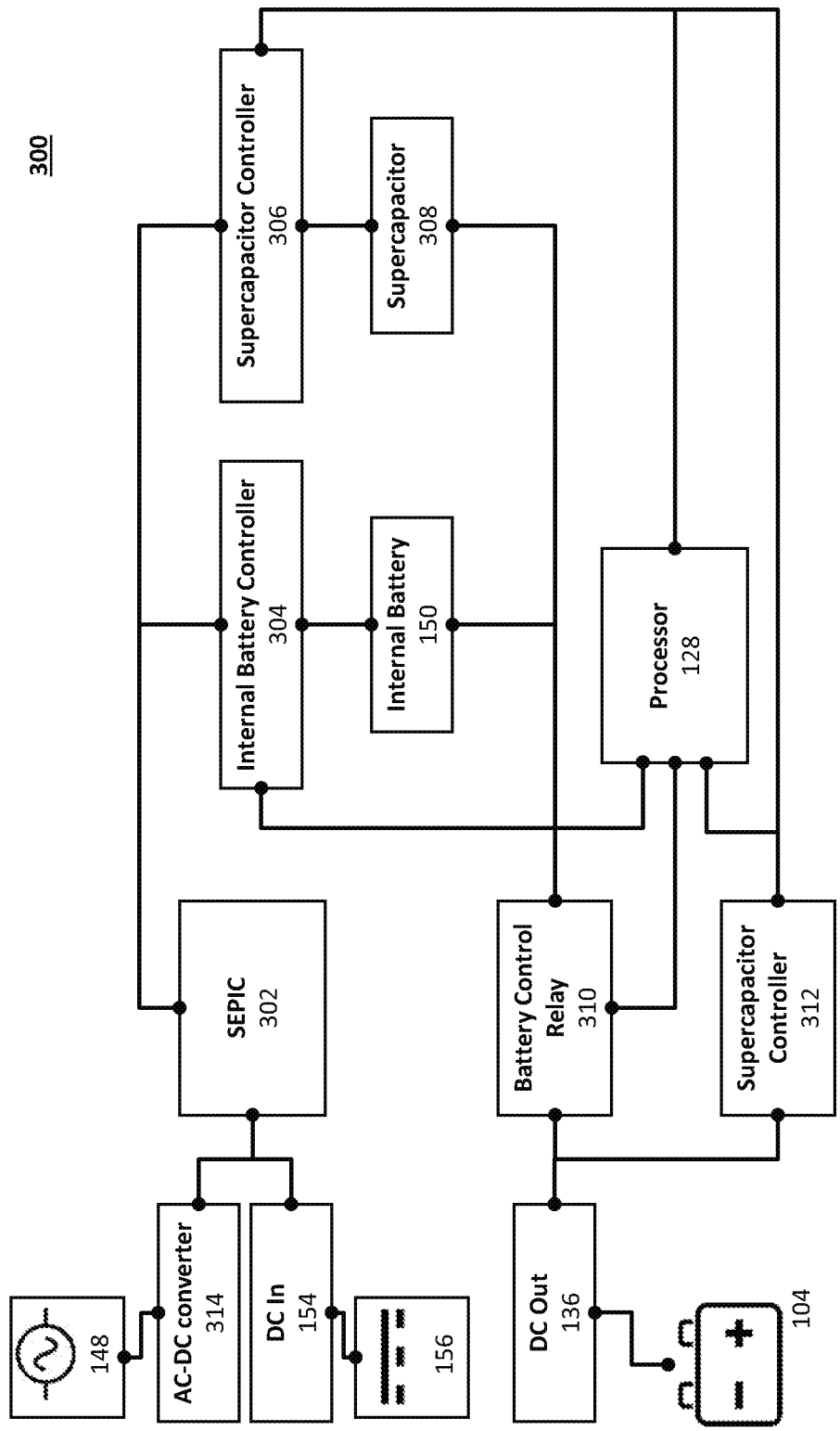
FIG. 3 illustrates an example schematic diagram of a charger having a single-ended primary-inductor converter circuit and a supercapacitor.

Accordingly, as illustrated in FIG. 3, a supercapacitor 308, or another storage capacitor, may be used in conjunction with the SEPIC circuit 302 to supply an amount of power that is sufficient to jump start a vehicle. Supercapacitors 308 are useful in that, unlike batteries, they do not necessarily suffer from ageing and temperature problems. Because the amount of energy in the capacitor is finite, however, supercapacitors 308 are primarily used for engine starting. Yet, when a supercapacitor is simply coupled to a depleted battery, the finite energy reserve is drained into the battery, often lowering the supercapacitor's 308 voltage to a level that cannot start an engine. A jump starter battery, on the otherhand, can start an engine as it has sufficient current to override the discharging effects of a depleted vehicle battery. In cold weather, however, the peak current that a battery can supply may be limited due to the temperature effecting the chemical reaction inside the jump starter battery. This limit in peak current may be such that the engine may not turn over. Thus, an improved system for starting the vehicle may be jump starter having both an internal battery 150 and a supercapacitor 308, where the battery can supplies sufficient current to overcome the effects of the depleted external battery 104, while the supercapacitor 308 may supply the peak current.

In general, a supercapacitor 308 can hold a very high charge that can be released relatively quickly, thereby making it suitable for jump starting a vehicle, since the vehicle cranking operation lasts for a very short period of time during which high cranking power is required. Moreover, supercapacitors 308 are relatively small in size and can be employed in the compact battery charger 102 to provide sufficient cranking power to jump-start a vehicle. In operation, the SEPIC circuit 302 would draw current from the depleted external battery 104, which would be used to charge the supercapacitor 308. A small lithium battery may be used in combination with the supercapacitor to prevent the supercapacitor 308 from discharging the current back to the depleted external battery 104 until the compact battery charger 102 determines that the user trying to start the vehicle. Existing supercapacitor jump starter systems are deficient because they would require the removal of one of the external battery 104 connections to prevent the capacitor from discharging back into the dead battery. The disclose arrangement, however, obviates the need to disconnect one of the external battery's 104 terminals. Thus, in one aspect of the present invention, a compact battery charger 102 is provided that employs a SEPIC circuit 302 in conjunction with a supercapacitor 308.

An example schematic diagram 300 of a charger having a SEPIC circuit 302 in conjunction with a supercapacitor 308 is illustrated in FIG. 3. As illustrated, DC input power is received from a DC power supply 156 via DC input terminal 154, or either AC power supply 148 via an AC to DC converter 314. The DC input power is received by SEPIC circuit 302 and output to the internal battery 150 and the supercapacitor 308, in parallel, via an internal battery controller circuit 304 and a supercapacitor controller circuit 306, respectively. The internal battery controller circuit 304 and a supercapacitor controller circuit 306 may be used to monitor the parameters of the internal battery 150 and the supercapacitor 308, such as the charge level. Further, internal battery controller circuit 304 may monitor the temperature of the internal battery 150. The parameters may be communicated to the processor 128, which controlled, inter alia, the battery control relay 310, and supercapacitor controller 312.

The supercapacitor 308 and internal battery 150 may receive charging current from the DC input power. When DC input power is unavailable, for instance, the supercapacitor 308 may receive charging current from external battery 104 via the supercapacitor controller 312. For example, if an external battery 104 having a nominal voltage of 12 VDC has depleted to 6 VDC, the external battery 104 may be unable to start a vehicle, but the remaining power may be drawn from the depleted external battery 104 to the supercapacitor 308, which could then be used to boost the vehicle. As noted above, existing supercapacitor-only battery boosters were required to disconnect one of the external battery's 104 terminals so as to avoid premature discharge of the supercapacitor into the depleted battery. The lithium ion battery, however, may be used to output a current to the external battery 104, which may be monitored by the processor 128. If a drop in current is detected at the DC output terminal 136, the processor 128 may determines that the user is attempting to start the vehicle and the supercapacitor controller 312 may be instructed to electrically couple the supercapacitor 308 to the external battery 104 (via DC output terminal 136), thereby causing the supercapacitor 308 to quickly discharge into the external battery 104, thereby enabling the vehicle to start. The processor 128 may be similarly configured to control the battery control relay 310, which enables the internal battery 150 to discharge into the external battery 104.

Thus, the internal battery 150 and a supercapacitor 308 can each be recharged by a SEPIC circuit 302, which may any input voltage between, for example, 5 VDC to 20 VDC. The internal battery controller circuit 304 recharges the battery inside the compact battery charger 102 properly, while a separate supercapacitor controller circuit 306 charges the supercapacitor 308. The supercapacitor 308 may also be recharged from the internal battery 150, thereby providing multiple peak current starts. The jump starting function is controlled by one or more processors 108 (e.g., a microprocessor(s)) once the jump starter cables are attached to an external battery 104 and the jump start function is engaged (either manually or automatically) the internal jump starter battery is connected by a circuit or relay to the vehicle's battery. The internal battery 150 transfers energy into the external battery 104 and when the vehicle ignition is actuated (e.g., the key is turned, or the start button is pressed), current drawn from the starter motor will cause a voltage drop across the jump starter connection leads. This voltage drop will be detected by the one or more processors 108, at which point the one or more processors 108 will electrically couple the supercapacitor in parallel with its internal battery 150 to supply the peak current required to start the engine. If the engine starts, the jump starter function is done and the compact battery charger 102 can recharge itself (e.g., the internal battery 150 and/or the supercapacitor 308) from an electrical connection to the vehicle's electrical system, which may continue until the internal battery 150 and/or the supercapacitor 308 are fully charged. Afterwhich the compact battery charger 102 may shut off its charging function, or the clamps are removed. If the vehicle does not start, once the starter is disengaged the voltage on the external battery 104 will stabilize and the supercapacitor 308 will recharge from the internal battery 150 (or any available power from the external battery 104), and prepare for the next attempt to start the engine, whereby the process is repeated.

There are a number of ways in which the internal battery 150 may be charged. The user may also charge the internal battery 150 while driving via the DC input terminal 154 using a 12 VDC car charger that couples to the cigarette lighter. Accordingly, a 12 VDC input socket may be used to recharge the compact battery charger 102 to a point where the compact battery charger 102 is charged. The compact battery charger 102 may then be used to jump start a vehicle having an external battery 104. In certain aspects, the compact battery charger 102 may be charged through the clamps, which may be retractable and/or configured to be housed in a recess of the compact battery charger's 102 housing 162. For example, charging may be accomplished by leaving the relay closed, thereby allowing the alternator in the vehicle, which can provide up to 70 A, to rapidly charge the internal battery 150. Thus, the compact battery charger 102 may be configured to sense the current in a bidirectional manner through the clamps (e.g., (1) to measure current going from the compact battery charger 102 into the external battery 104, and (2) from the external battery 104 into the compact battery charger 102). To prevent overheating when current is passing into the compact battery charger 102, a temperature sensor may be coupled to the compact battery charger 102, whereby the relay is shut off if the compact battery charger 102, or the internal battery 150, reaches a predetermined shut-off temperature threshold. Indeed, a benefit of maximizing the amount of current going back into the compact battery charger 102 is that it yields a faster charge.

In lieu of clamps, the compact battery charger's 102 charger cables may be fixedly coupled to the external battery 104 (e.g., via a bolt and ring terminals) and configured to quick connect to compact battery charger 102 (e.g., using quick connects/disconnect connectors). In certain instances, the quick connect connectors may not be compatible with different devices. For example, a battery maintainer (a/k/a trickle charger) may use a first type of connector, while a compact battery charger 102 may use a second type of connector. Such issues are common between different manufacturers. Due to the inconvenience of disconnecting and reconnecting the fixedly coupled connections, it may be advantageous to use a charger cable that fixedly couples to the external battery 104 at one end, but provides a plurality of different connectors at the second end. For example, the first end may be fixedly coupled to a battery terminal through the ring terminals, while the second end may be provided with two connecters, namely (1) an EC5 (male) connector configured to couple with an EC5 (female) connector of the compact battery charger 102 and (2) a second (male) connector configured to couple with a second (female) connector of a battery charger/maintainer. One or more end caps may be further provided to protect the unused connector from dirt and debris. Such a charger cable would be of particular use for vehicles that are not often used and typically require jump starting. While two connectors are described, such a charger cable need not be limited to two connectors, nor should it be limited to the example connector types described.

In another alterative, the entire compact battery charger 102 may be permanently coupled to an external battery 104 or a vehicle's electrical system (e.g., installed under the hood or inside the vehicle). For example, the compact battery charger 102 may be fixedly coupled to the vehicle and remotely actuated using a physical button or controller (e.g., one positioned under the hood, on the dashboard, in the glove box, etc.), or wirelessly. When integrated with the vehicle, the compact battery charger's 102 housing 162 may be fabricated to mitigate damage from engine temperature or engine fluids. Wireless control may be accomplished using, for example, a portable electronic device 152 that is communicatively coupled to the compact battery charger 102 via a communication network. For instance, a smart phone may wirelessly send a signal to the compact battery charger 102, either directly or through the vehicle's control system, which causes the compact battery charger 102 to output boosting energy or charging energy to the external battery 104 of the vehicle. The wireless communication may employ one or more wireless standards such as Bluetooth (e.g., short-wavelength, UHF radio waves in the ISM band from 2.4 to 2.485 GHz), NFC, Wi-Fi (e.g., IEEE 802.11 standards), etc. When permanently coupled to the external battery 104 or vehicle's electrical system, the compact battery charger 102 may charge the internal battery 150 when the vehicle is running via the vehicle's electrical system (e.g., 12 VDC supply).

In certain aspects, the supercapacitor 308 may be integrated with the vehicle's electrical system and configured to receive any residual power from the vehicle's accessories for use in jump starting the vehicles. For example, vehicles often have sufficient power to power the vehicle's entertainment system, but insufficient power to turn over the engine. In this example, the power may be diverted from the entertainment system (or other accessory or auxiliary system) at the press of a button and used to charge an integrated supercapacitor, which may be used to jump start the vehicle.

In certain aspects, the compact battery charger 102 may facilitate wireless charging via a set of wireless coils 160a, 160b. For example, the compact battery charger 102 may employ inductive charging to facilitate wireless charging of the internal battery 150 where the compact battery charger 102 may be placed on a corresponding charging inductor pad to charge the compact battery charger's 102 internal battery 150. In this example, the charging inductor pad may comprise a wireless charging coil that creates an alternating electromagnetic field from within a charging inductor pad and a wireless charging coil may be positioned in or on the housing 162 of in the compact battery charger 102 to receive power from the electromagnetic field and converts the received power into electric current to charge the internal battery 150. The first and second wireless charging coils 160a, 160b in proximity couple to form an electrical transformer to enable power transfer therebetween. Greater distances between first and second wireless charging coils 160a, 160b (transmitter and receiver coils) can be achieved when the wireless charging system uses magnetic resonance coupling. The first and second wireless charging coils 160a, 160b may be fabricated using a number of materials, such as silver plated copper (or aluminum) to minimize weight and decrease resistance resulting from the skin effect.

The charging inductor pad and/or the compact battery charger 102 may operate in compliance with one or more wireless power transfer standards, such as the Power Matters Alliance (PMA) under the IEEE Standards Association (IEEE-SA) Industry Connections, Rezence, and Qi. The PMA interface standard describes analog power transfer (inductive and resonant), digital transceiver communication, cloud based power management, and environmental sustainability.

Rezence is an interface standard developed by the Alliance for Wireless Power (A4WP) for wireless electrical power transfer based on the principles of magnetic resonance. The Rezence system comprises a single power transmitter unit (PTU) and one or more power receiver units (PRUs). The interface standard supports power transfer up to 50 Watts, at distances up to 5 centimeters. The power transmission frequency is about 6.78 MHz, and a plurality of devices can be powered from a single PTU depending on transmitter and receiver geometry and power levels. To use the Rezence system, the compact battery charger 102 (i.e., PRU) is placed on top of the charging inductor pad (i.e., PTU), which charges the compact battery charger's 102 internal battery 150 via magnetic resonance coupling between the first and second wireless charging coils 160a, 160b. In addition to power transfer between the first and second wireless charging coils 160a, 160b, the Rezence system may be used to transfer data, for example, from the compact battery charger 102 (e.g., from the internal data storage device 122) to another device via the charging inductor pad. There exists, however, overlap between the PMA and Rezence specifications. For instance, PMA adopted the Rezence specification as the PMA magnetic resonance charging specification for both transmitters and receivers in both single and multi-mode configurations, while Rezence adopted the PMA inductive specification as a supported option for multi-mode inductive, magnetic resonance implementations.

Qi is an interface standard developed by the Wireless Power Consortium (WPC) for inductive electrical power transfer over distances of up to 4 centimeters. The Qi wireless charging standard uses electromagnetic induction to transfer power wirelessly between wireless charging coils 160a, 160b. The Qi system comprises a PTU and a PRU. To use the Qi system to charge the compact battery charger 102, the compact battery charger 102 (i.e., PRU) is placed on top of the charging inductor pad (i.e., PTU), which charges the compact battery charger's 102 internal battery 150 via inductive coupling.

Wireless charging offers advantages to the compact battery charger 102, beyond convenience of use. First, the connections on both the compact battery charger 102 and charging pad are enclosed; therefore corrosion is avoided (or mitigated) because any electronic components are protected from water and oxygen in the atmosphere. Moreover, to mitigate water damage, the compact battery charger's 102 housing 162 may be waterproof and buoyant to facilitate, for example, marine applications. Second, wireless charging also lends durability to the compact battery charger 102 because the need to plug and unplug the device is obviated, resulting in significantly less wear and tear on the socket of the device and the attaching cable.

In certain aspects, the compact battery charger 102 may employ solar cells to facilitate a charging of the internal battery 150 and/or supercapacitor 308. The solar cell may be provided as a separate solar cell panel, or integrated with the compact battery charger 102. For example, solar cells may be positioned on an exterior surface of the compact battery charger's 102 housing 162 or, when integrated with a vehicle, the solar cell may be positioned on the vehicle, such as the roof, hood, trunk, windows, etc.

The compact battery charger's 102 housing 162 may further comprise a metal (e.g., aluminum) plate on a back side to facilitate exterior warming of the interior battery 150 via the user's hand. Conversely, a button may be provided on the user interface 138 that causes power to be diverted from the interior battery 150 to a heating apparatus, such as a flexible heater. Flexible heaters can conform to a surface, such as a compact battery charger 102. Example flexible heaters include silicone rubber heaters, polyimide film heaters, heating tapes, etc. Suitable flexible heaters include, for example, polyimide film insulated flexible heaters, such as those available from OMEGA Engineering Inc, and Kapton heaters (a form of ultra-thin, ultra-flexible, semitransparent, lightweight heaters), such as those available from Bucan Electric Heating Devices Inc.

The DC power may be output to the external battery 104 or other devices by way of a DC output terminal 136 (e.g., battery terminal cables/clamps). Thus, power management circuit 132 and processor 128 may control the charging operation of the external battery 104 to provide charging, maintaining, and, in certain embodiments, the jump start function. Further, power management circuit 132 and processor 128 may facilitate reverse hook-up protection, as well as automatic nominal battery voltage detection. While the power management circuit 132 and processor 128 are illustrated as separate components, one of skill in the art would appreciate that power management functionality (e.g., battery charging, battery maintaining, etc.) may be provided as a single component that combines the functionality of the power management circuit 132 and processor 128.

The output power may be controlled by software (e.g., via a relay, MOSFET, and/or a silicon-controlled rectifier). The output power may be controlled using one or more parameters, such as maximum current over time, maximum temperature of battery, maximum time alone and/or minimum voltage (with or without time). Thus, when a parameter value is exceeded (or a requirement isn't met), the output voltage may be shut off. The compact battery charger 102 may include the ability to sense, or otherwise detect, that a battery (or other load/power supply) is coupled to the clamps. When a battery is not detected, the power may be shut off; however, the user may be provided with a manual override option (e.g., by holding a button for a predetermined amount of time, such as 2 to 10 seconds, or about 5 seconds). In certain aspects, the compact battery charger 102 may not charge an external battery 104 when the external battery 104 is too hot or cold, thereby avoiding potential hazards and maintaining efficiency.

The compact battery charger 102 may further include the ability to sense the occurrence of a manual override, and, if voltage is still 0 after engine start, the user may be instructed to check and replace the vehicle battery. Further, an automatic shut-off function may be provided if a battery/load/power supply is not attached to the clamps within a predetermined amount of time (e.g., about 1 to 60 minutes, more preferably about 5 to 30 minutes, most preferably about 15 minutes). The compact battery charger 102 may further preheat a cold battery by, for example, running amperes though the battery, or an internal heater. The compact battery charger 102 may further employ alternate power sources, such as a solar panel to enable battery maintaining and charging, as well as data monitoring through solar panels (e.g., one or more 12-14 Watt panels). For example, solar cells may be used to charge or maintain fleet vehicles, such as vehicle dealership fleets, rental vehicles fleets, etc.

To use the jump start function, the DC output terminal 136 may be coupled to the external battery 104 (i.e., the battery to be charged/jumped, whether directly or indirectly) and the user interface 138 may be used to activate the boost feature. If the compact battery charger 102 is being charged when the jump start function is selected, the display device 114 may indicate that the jump start function cannot be performed while the compact battery charger 102 is charging. If the clamps are improperly connected (e.g., reverse polarity or disconnected), an aural alarm may sound, and the display device 114 may display a warning message, such as "Warning—Reverse Polarity" or "Warning—Battery Disconnected." Conversely, if the clamps are properly connected and the compact battery charger 102 is ready for use, the display device 114 may display a standby message, such as "Jump Start Ready."

If the compact battery charger's 102 jump start function is attempted twice within a predetermined time period (e.g., a minute), the jump start function may be prohibited until the compact battery charger 102 has cooled down. During the cool down period, the display device 114 may display a cool down message, which may also indicate the remaining time for the cool down period.

If the external battery 104's voltage is too low for the compact battery charger 102 to detect that the clamps are connected, a manual start procedure (e.g., the manual override) may be selected to enable the jump start function. To use the manual start procedure, the DC output terminal 136 may be coupled to the external battery 104 and the user interface 138 may be used to activate the boost feature. For example, the same button may be used to trigger the jump start function, but instead of a momentary press, the button may be pressed and held for a predetermined period of time (e.g., about 2 to 10 seconds, more preferably about 5 seconds) until the display device 114 displays the standby message. In certain aspects, the manual start procedure may override safety features to ensure that power is delivered regardless of connection status. Accordingly, the compact battery charger 102 may energize the clamps and cause sparking if they are touched together (i.e., shorted).

Figure 2:
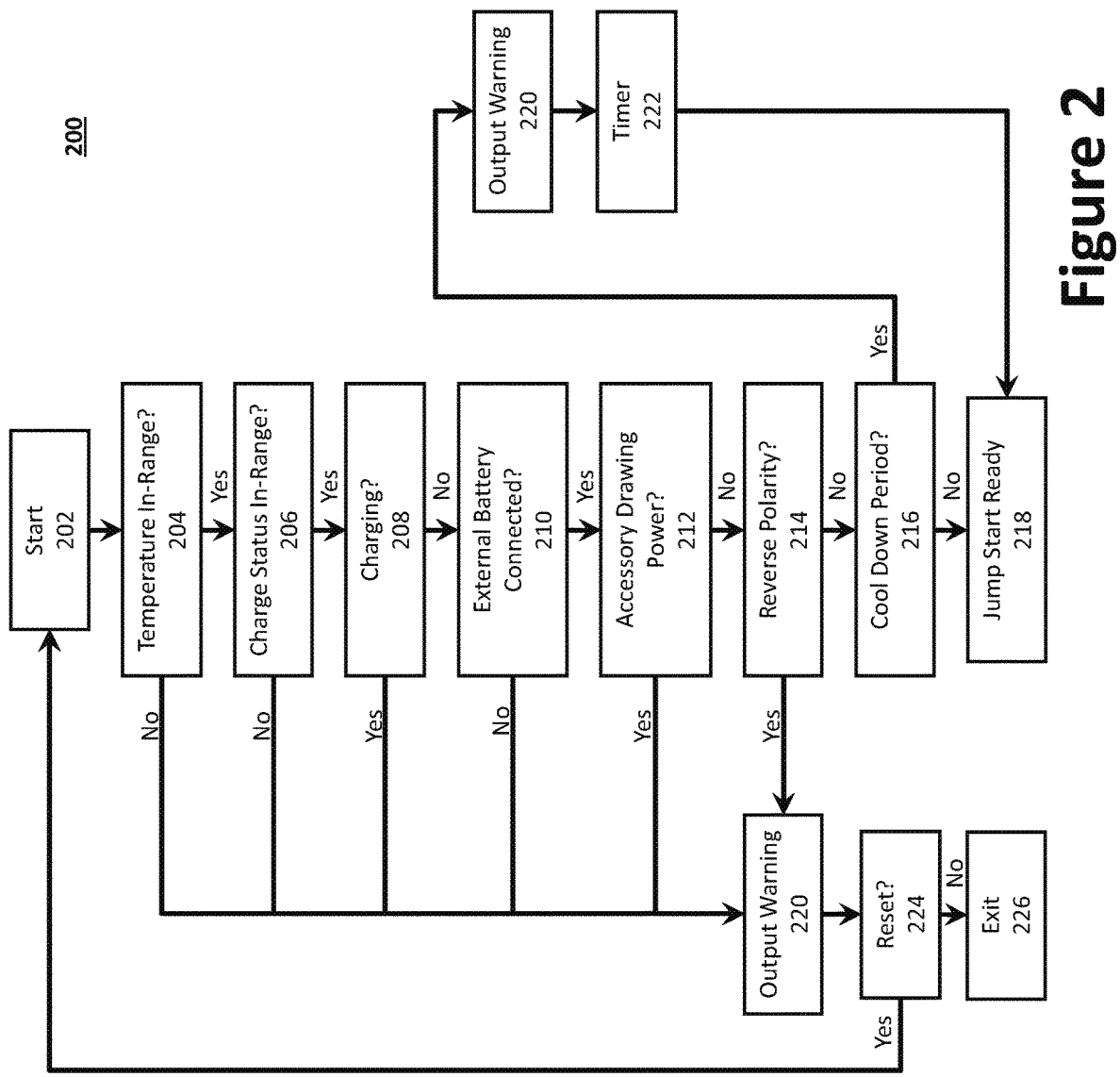
FIG. 2 illustrates a flow diagram of an example method for providing the jump start function using a compact battery charger.

FIG. 2 illustrates a flow diagram 200 of an example method for providing the jump start function using a compact battery charger 102. The process starts at step 202, which may be initiated by the user actuating a jump start function button on the user interface 138. At step 204, the compact battery charger's 102 processor 128 determines, using one or more sensors, whether the temperature of the internal battery 150 is within an operating range. For example, if the temperature of the internal battery 150 exceeds a first predetermined shut-off temperature threshold, a warning is provided at step 220 indicating that the internal battery 150 is too hot. Similarly, if the temperature of the internal battery 150 does not meet a first predetermined shut-off temperature threshold, a warning is provided at step 220 indicating that the internal battery 150 is too cold. Otherwise, the process proceeds to the next step.

At step 206, the compact battery charger's 102 processor 128 determines whether the state of charge for the internal battery 150 is within an operating range. For example, if the internal battery 150's state of charge does not meet a predetermined charge level threshold, a warning is provided at step 220 indicating that the internal battery 150 is not adequately charged. Otherwise, the process proceeds to the next step.

At step 208, the compact battery charger's 102 processor 128 determines whether the internal battery 150 is being charged. If the internal battery 150's is being charged, a warning is provided at step 220 indicating that the internal battery 150 is being charged and cannot be used to provide the jump start function. Otherwise, the process proceeds to the next step.

At step 210, the compact battery charger's 102 processor 128 determines whether an external battery 104 is coupled to the compact battery charger 102 (e.g., via clamps coupled to the DC output terminal 136). If no external battery 104 is detected (e.g., by measuring a voltage or resistance across the battery terminals), a warning is provided at step 220 indicating that the external battery 104 is not detected. Otherwise, the process proceeds to the next step.

At step 212, the compact battery charger's 102 processor 128 determines whether an accessory is currently coupled to, or otherwise using, the compact battery charger 102 (e.g., via DC output terminal 136 or an AC output terminal). If an accessory is detected (e.g., by detecting a load or other current draw at an output terminal), a warning is provided at step 220 indicating that the internal battery 150 is in use and cannot be used to provide the jump start function. Otherwise, the process proceeds to the next step.

At step 214, the compact battery charger's 102 processor 128 determines whether an external battery 104 is properly coupled to the compact battery charger 102. If a reverse polarity condition is detected for the external battery 104, a warning is provided at step 220 indicating that the external battery 104 is improperly connected. Otherwise, the process proceeds to the next step.

At step 216, the compact battery charger's 102 processor 128 determines whether the compact battery charger 102 is in a cool down period. For example, as noted above, if the compact battery charger's 102 jump start function is attempted twice within a predetermined time period (e.g., a minute), the jump start function may be prohibited until the compact battery charger 102 has cooled down (i.e., the predetermine time period has elapsed). Accordingly, if the jump start function has been performed within a predetermined period of time, a warning is provided at step 220 indicating a cool down message, which may also indicate the remaining time for the cool down period. After the predetermined time period has elapsed at step 222 (e.g., using a timer), the process may proceed to the next step.

At step 218, the compact battery charger 102 is ready to perform the jump start function, whereby boosting energy may be output to the external battery 104 upon actuating the jump start function button on the user interface 138, or automatically. The boosting energy may be provided for a predetermined period of time, before shutting off. For example, the boosting energy may be provided for 1 to 60 seconds, more preferably 5 to 30 seconds.

A warning may be provided at step 220 via one or more of a display device 114, a speaker 124, or to another device (e.g., a portable electronic device 152) via a communication network. The message may indicate to the user one or more statuses/conditions of the internal battery 150, external battery 104, and/or of the compact battery charger 102, such as those illustrated in Table A.

At step 224, the process may be reset such that the process is repeated. The reset feature may be manually triggered (e.g., via a button) or automatically once a predetermined condition is met. For example, if the temperature of the internal battery 150 is outside of the operating range, the system may be automatically reset once the temperature of the internal battery 150 returns to the operating range. If a reset is not selected at step 224, the processed exits at step 226.

In certain aspects, a manual override option may be selected (e.g., at any time) that causes the compact battery charger 102 to proceed to step 218, the compact battery charger 102 is ready to perform the jump start function, regardless of the status of the internal battery 150, external battery 104, or of the compact battery charger 102. Further, the compact battery charger's 102 processor 128 determines whether the voltage of the internal battery 150 or the external battery 104 exceeds a predetermined threshold, in which case charging and/or boosting is prohibited to prevent overcharging.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A jump starting apparatus for jump starting a vehicle having an external battery, the jump starting apparatus comprising:
    a housing;
    a direct current (DC) output port positioned on the housing and configured to electrically couple with the vehicle via a pair of battery cables;
    a rechargeable lithium battery positioned in the housing and configured to supply, via the DC output port, a starting current to jump start the vehicle, wherein said rechargeable lithium battery is rated at least 3,000 mAh and the starting current is rated at least 200 cranking amperes;
    a wireless charging coil positioned in or on the housing and configured to transfer power wirelessly between the rechargeable lithium battery and an external device in accordance with a wireless power transfer standard;
    one or more display devices positioned on the housing and configured to display (1) a status of the wireless charging coil, and (2) a state of charge of the rechargeable lithium battery; and
    at least one processor operatively coupled to the rechargeable lithium battery, the wireless charging coil, and the display device via a display driver, wherein the at least one processor is configured to control (1) power transfer between the rechargeable lithium battery and the external device via the wireless charging coil, and (2) operation of the display device.

2. The jump starting apparatus of claim 1, wherein the wireless power transfer standard is the Qi wireless power transfer standard.

3. The jump starting apparatus of claim 1, wherein the display device is a liquid crystal display (LCD) and the state of charge of the rechargeable lithium battery is represented as a numerical value.

4. The jump starting apparatus of claim 1, further comprising a wireless transceiver configured to communicate data or commands between the jump starting apparatus and an external electronic device.

5. The jump starting apparatus of claim 1, wherein the wireless charging coil is configured to transfer power wirelessly between the rechargeable lithium battery and the external device through magnetic resonance.

6. The jump starting apparatus of claim 1, wherein the wireless charging coil is configured to transfer power wirelessly between the rechargeable lithium battery and the external device through electromagnetic induction.

7. The jump starting apparatus of claim 1, wherein the DC output port is an EC5 connector.

8. The jump starting apparatus of claim 1, further comprising a second DC output port to supply a first charging current and a third DC output port to supply a second charging current that is greater than the first charging current.

9. The jump starting apparatus of claim 8, wherein each of the second DC output port and the third DC output port is a universal serial bus (USB) port.

10. The jump starting apparatus of claim 9, wherein the first charging current and the second charging current are each 3.0 amperes or less.

11. The jump starting apparatus of claim 1, further comprising a manual override interface, wherein the jump starting apparatus is configured to output the starting current to the vehicle via the DC output port upon actuation of the manual override interface regardless of whether one or more conditions are satisfied relating to a connection between the external battery and the pair of battery cables.

12. The jump starting apparatus of claim 11, wherein the one or more conditions include that the external battery is connected across the pair of battery cables and that a reverse polarity condition does not exist.

13. A jump starting apparatus for jump starting a vehicle having an external battery, the jump starting apparatus comprising:
    a housing;
    a direct current (DC) output port positioned on the housing and configured to electrically couple with the vehicle via a pair of battery cables;
    a rechargeable lithium battery positioned in the housing and configured to supply, via the DC output port, a starting current to jump start the vehicle, wherein said rechargeable lithium battery is rated at least 3,000 mAh and the starting current is rated at least 200 cranking amperes;
    a wireless charging coil positioned in or on the housing and configured to transfer power wirelessly between the rechargeable lithium battery and an external device in accordance with a wireless power transfer standard;
    one or more display devices positioned on the housing and configured to display (1) a status of the wireless charging coil, and (2) a state of charge of the rechargeable lithium battery;
    at least one processor operatively coupled to the rechargeable lithium battery, the wireless charging coil, and the display device via a display driver, wherein the at least one processor is configured to control (1) power transfer between the rechargeable lithium battery and the external device via the wireless charging coil, and (2) operation of the display device; and
    a manual override interface, wherein the jump starting apparatus is configured to output the starting current to the vehicle via the DC output port upon actuation of the manual override interface regardless of whether the vehicle is connected electrically to the DC output port.

14. The jump starting apparatus of claim 13, wherein the wireless charging coil is configured to transfer power wirelessly between the rechargeable lithium battery and the external device through magnetic resonance or electromagnetic induction.

15. The jump starting apparatus of claim 13, wherein the wireless power transfer standard is the Qi wireless power transfer standard.

16. The jump starting apparatus of claim 13, further comprising a second DC output port to supply a first charging current and a third DC output port to supply a second charging current that is greater than the first charging current.

17. The jump starting apparatus of claim 16, wherein each of the second DC output port and the third DC output port is a universal serial bus (USB) port.

18. A jump starting apparatus for jump starting a vehicle having an external battery, the jump starting apparatus comprising:
a housing;
a first direct current (DC) output port positioned on the housing and configured to electrically couple with the vehicle via a pair of battery cables;
a rechargeable lithium battery positioned in the housing and configured to supply, via the first DC output port, a starting current to jump start the vehicle, wherein said rechargeable lithium battery is rated at least 3,000 mAh and the starting current is rated at least 200 cranking amperes;
a wireless charging coil positioned in or on the housing and configured to transfer power wirelessly between the rechargeable lithium battery and an external device in accordance with a wireless power transfer standard;
one or more display devices positioned on the housing and configured to display (1) a status of the wireless charging coil, and (2) a state of charge of the rechargeable lithium battery;
a second DC output port to supply a first charging current that is less than the starting current; and
at least one processor operatively coupled to the rechargeable lithium battery, the wireless charging coil, and the display device via a display driver, wherein the at least one processor is configured to control (1) power transfer between the rechargeable lithium battery and the external device via the wireless charging coil, and (2) operation of the display device.

19. The jump starting apparatus of claim 18, further comprising a third DC output port to supply a second charging current that is greater than the first charging current.

20. The jump starting apparatus of claim 19, wherein each of the second DC output port and the third DC output port is a universal serial bus (USB) port.

21. A jump starting apparatus for jump starting a vehicle having an external battery, the jump starting apparatus comprising:
a housing;
a first direct current (DC) output port positioned on the housing and configured to electrically couple with the vehicle via a pair of battery cables;
a rechargeable lithium battery positioned in the housing and configured to supply, via the first DC output port, a starting current to jump start the vehicle, wherein said rechargeable lithium battery is rated at least 3,000 mAh and the starting current is rated at least 200 cranking amperes;
a wireless charging coil positioned in or on the housing and configured to transfer power wirelessly between the rechargeable lithium battery and an external device;
one or more display devices positioned on the housing and configured to display a state of charge of the rechargeable lithium battery;
a second DC output port to supply a first charging current that is less than the starting current; and
at least one processor operatively coupled to the rechargeable lithium battery, the wireless charging coil, and the display device via a display driver, wherein the at least one processor is configured to control (1) power transfer between the rechargeable lithium battery and the external device via the wireless charging coil, and (2) operation of the display device.

22. The jump starting apparatus of claim 21, further comprising a third DC output port to supply a second charging current that is greater than the first charging current.

23. The jump starting apparatus of claim 22, wherein each of the second DC output port and the third DC output port is a universal serial bus (USB) port.

24. A jump starting apparatus for jump starting a vehicle having an external battery, the jump starting apparatus comprising:
a housing;
a first direct current (DC) output port positioned on the housing and configured to electrically couple with the vehicle via a pair of battery cables;
a rechargeable lithium battery positioned in the housing and configured to supply, via the first DC output port, a starting current to jump start the vehicle, wherein the starting current is rated at least 200 cranking amperes;
a wireless charging coil positioned in or on the housing and configured to transfer power wirelessly between the rechargeable lithium battery and an external device;
one or more display devices positioned on the housing and configured to display a state of charge of the rechargeable lithium battery; and
at least one processor operatively coupled to the rechargeable lithium battery, the wireless charging coil, and the display device, wherein the at least one processor is configured to control (1) power transfer between the rechargeable lithium battery and the external device via the wireless charging coil, and (2) operation of the display device.

25. The jump starting apparatus of claim 24, wherein the state of charge of the rechargeable lithium battery is represented as a numerical value.

26. The jump starting apparatus of claim 24, further comprising a wireless transceiver configured to communicate data or commands between the jump starting apparatus and an external electronic device.

27. The jump starting apparatus of claim 24, further comprising a second DC output port to supply a first charging current and a third DC output port to supply a second charging current that is greater than the first charging current.

28. The jump starting apparatus of claim 24, further comprising a manual override interface, wherein the jump starting apparatus is configured to output the starting current to the vehicle via the DC output port upon actuation of the manual override interface regardless of whether one or more conditions are satisfied relating to a connection between the external battery and the pair of battery cables.

* * * * *